US011606802B2

(12) United States Patent
Hooli et al.

(10) Patent No.: US 11,606,802 B2
(45) Date of Patent: Mar. 14, 2023

(54) METHOD, SYSTEM AND APPARATUS

(71) Applicant: Nokia Solutions and Networks Oy, Espoo (FI)

(72) Inventors: Kari Juhani Hooli, Oulu (FI); Esa Tapani Tiirola, Kempele (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 174 days.

(21) Appl. No.: 15/764,355

(22) PCT Filed: Sep. 28, 2016

(86) PCT No.: PCT/EP2016/073034
§ 371 (c)(1),
(2) Date: Mar. 29, 2018

(87) PCT Pub. No.: WO2017/055309
PCT Pub. Date: Apr. 6, 2017

(65) Prior Publication Data
US 2018/0288787 A1   Oct. 4, 2018

(30) Foreign Application Priority Data

Oct. 1, 2015   (EP) .................. PCT/EP2015/072762

(51) Int. Cl.
H04W 72/12   (2009.01)
H04W 74/08   (2009.01)
(Continued)

(52) U.S. Cl.
CPC ....... H04W 72/1268 (2013.01); H04L 5/0053 (2013.01); H04L 27/0006 (2013.01);
(Continued)

(58) Field of Classification Search
CPC ............. H04W 72/1268; H04W 16/14; H04W 72/1284; H04W 74/0808; H04W 72/1215;
(Continued)

(56) References Cited

U.S. PATENT DOCUMENTS 10,091,659 B2 * 10/2018 Ng .......................... H04W 48/12
2015/0223075 A1 * 8/2015 Bashar .................. H04W 16/14
370/329

(Continued)

FOREIGN PATENT DOCUMENTS

CN   101222272 A   7/2008
CN   101227260 A   7/2008

OTHER PUBLICATIONS

3GPP TSG RAN WG1 Meeting #80bis, Belgrade, Serbia, Apr. 20-24, 2015, R1-151719, "Potential design for LAA UL transmission", ZTE, 5 pgs.

(Continued)

Primary Examiner — Mohammed S Chowdhury
Assistant Examiner — Hassan A Phillips
(74) Attorney, Agent, or Firm — Harrington & Smith

(57) ABSTRACT

There is provided a method including determining, at a user device capable of transmitting at least one subframe, the subframe having a subframe structure including at least one first symbol associated with one of physical layer signals and a first channel, and at least one second symbol associated with a second channel, if the respective one of physical layer signals and the first channel is scheduled to be transmitted in the at least one first symbol and, if the respective one of physical layer signals and the first channel is not scheduled to be transmitted in the at least one first symbol, causing transmission of a signal indicating channel occupancy during the at least one first symbol and transmission of the second channel during the at least one second symbol.

20 Claims, 7 Drawing Sheets

(51) Int. Cl.
  *H04L 5/00* (2006.01)
  *H04L 27/00* (2006.01)
  *H04W 16/14* (2009.01)
  *H04W 72/1268* (2023.01)
(52) U.S. Cl.
  CPC ....... *H04W 16/14* (2013.01); *H04W 72/1284* (2013.01); *H04W 74/0808* (2013.01)
(58) Field of Classification Search
  CPC ........... H04W 74/0816; H04L 27/0006; H04L 5/0053
  USPC ....................................................... 370/329
  See application file for complete search history.

(56) References Cited

U.S. PATENT DOCUMENTS

| | | | | |
|---|---|---|---|---|
| 2015/0312793 A1* | 10/2015 | Jeon | ................. | H04W 28/0205 370/329 |
| 2016/0100406 A1* | 4/2016 | Chen | ................. | H04W 72/0413 370/329 |
| 2016/0242039 A1* | 8/2016 | Drugge | ............. | H04W 74/0816 |
| 2016/0302225 A1* | 10/2016 | Damnjanovic | ....... | H04W 72/04 |
| 2017/0325215 A1* | 11/2017 | Takeda | .................. | H04W 74/08 |
| 2017/0374679 A1* | 12/2017 | Park | .......................... | H04L 5/00 |
| 2018/0006788 A1* | 1/2018 | Lee | ........................ | H04W 52/32 |
| 2018/0255578 A1* | 9/2018 | Kim | ........................ | H04L 5/001 |
| 2018/0288790 A1* | 10/2018 | Kim | ...................... | H04W 72/12 |

OTHER PUBLICATIONS

3GPP TSG RAN WG1 Meeting #81, Fukuoka, Japan, May 25-29, 2015, R1-153439, "Comparison of evaluation results for various UL LBT options", Intel Corp., 9 pgs.

3GPP TSG RAN WG1 #82bis, Malmo, Sweden, Oct. 5-9, 2015, R1-155474, "Partial subframe for LAA", Samsung, 6 pgs.

3GPP TSG RAN WG1 Meeting #81, Fukuoka, Japan, May 25-29, 2015, R1-152815, "On UL multiplexing in the LAA scenario", Nokia Networks, 7 pgs.

"LBT Impacts On High Layers For LAA", ZTE, 3GPP TSG-RAN WG2 meeting #90, R2-152327, May 2015, 3 pgs.

* cited by examiner

METHOD, SYSTEM AND APPARATUS

FIELD

The present application relates to a method, apparatus, system and computer program and in particular but not exclusively to standalone operation in unlicensed spectrum.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies.

SUMMARY

In a first aspect there is provided a method comprising determining, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol and, if the respective one of physical layer signals and the first channel is not scheduled to be transmitted in the at least one first symbol, causing transmission of a signal indicating channel occupancy during the at least one first symbol and transmission of the second channel during the at least one second symbol.

The method may comprise, if the respective one of physical layer signals and the first channel is scheduled to be transmitted in the at least one first symbol, causing transmission of the respective one of the physical layer signal and first channel during the at least one first symbol and transmission of the second channel during the at least one second symbol The at least one first symbol may comprise at least two first symbols, wherein at least one symbol of the at least two first symbols is associated with physical layer signals and at least one symbol of the at least two first symbols is associated with the first channel.

The method may comprise determining if physical layer signals are scheduled to be transmitted in the at least one symbol associated with physical layer signals and, if physical layer signals are scheduled to be transmitted in the at least one symbol associated with physical layer signals, causing transmission of the physical layer signals during the at least one symbol associated with physical layer signals and transmission of the second channel during the at least one second symbol and, if physical layer signals are not scheduled to be transmitted in the at least one symbol associated with physical layer signals, causing transmission of the signal indicating channel occupancy in the at least one symbol associated with physical layer signals and transmission of the second channel during the at least one second symbol.

The method may comprise determining if the first channel is scheduled to be transmitted in the at least one symbol associated with the first channel and, if the first channel is scheduled to be transmitted in the at least one symbol associated with the first channel, causing transmission of the first channel in the at least one symbol associated with the first channel and transmission of the second channel during the at least one second symbol and, if the first channel is not scheduled to be transmitted in the at least one symbol associated with the first channel, causing transmission of the signal indicating channel occupancy in the at least one symbol associated with the first channel and transmission of the second channel during the at least one second symbol.

The method may comprise performing a listen before talk procedure to determine if said user device is capable of transmitting the at least one subframe in a first channel.

The method may comprise receiving determined resources to be used for transmission of the respective one of physical layer signals and the first channel in the at least one first symbol.

The signal indicating channel occupancy may be associated with a cell to which the user device is associated.

Transmission power for the signal indicating channel occupancy may be different from the transmission power for physical layer signals, the first channel and the second channel.

Transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be one of a Zadoff-Chu sequence and a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a second aspect there is provided a method comprising receiving, from a user device, at least one subframe, the subframe having a subframe structure comprising at least one first symbol associated with one of physical layer signals and a first channel, and at least one second symbol associated with a second channel and the sub frame comprising, if the respective one of physical layer signals and the first channel is not scheduled to be transmitted in the at least one first symbol, a signal indicating channel occupancy during the at least one first symbol and the second channel during the at least one second symbol.

The sub frame may comprise, if the respective one of physical layer signals and the first channel is scheduled to be transmitted in the at least one first symbol, the respective one of the physical layer signal and first channel during the at least one first symbol and the second channel during the at least one second symbol;

The at least one first symbol may comprise at least two first symbols, wherein at least one symbol of the at least two first symbols is associated with physical layer signals and at least one symbol of the at least two first symbols is associated with the first channel.

If physical layer signals are scheduled to be transmitted in the at least one symbol associated with physical layer signals, the subframe may comprise physical layer signals during the at least one symbol associated with physical layer signals and the second channel during the at least one second symbol.

If physical layer signals are not scheduled to be transmitted in the at least one symbol associated with physical layer signals, the subframe may comprise a signal indicating channel occupancy in the at least one symbol associated with physical layer signals and the second channel during the at least one second symbol.

If the first channel is scheduled to be transmitted in the at least one symbol associated with the first channel, the subframe may comprise the first channel in the at least one symbol associated with the first channel and the second channel during the at least one second symbol.

If the first channel is not scheduled to be transmitted in the at least one symbol associated with the first channel, the subframe may comprise the signal indicating channel occupancy in the at least one symbol associated with the first channel and the second channel during the at least one second symbol.

The method may comprise determining resources to be used for transmission of the respective one of physical layer signals and the first channel in the at least one first symbol and providing the determined resources to the user device.

The method may comprise determining resources for the signal indicating channel occupancy, the resources associated with a cell to which the user device is associated and providing the determined resources to the user device.

Transmission power for the signal indicating channel occupancy may be different from the transmission power for physical layer signals, the first channel and the second channel.

The transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be a Zadoff-Chu sequence or a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a third aspect there is provided an apparatus comprising means for determining, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol and means for, if the respective one of physical layer signals and the first channel is not scheduled to be transmitted in the at least one first symbol, causing transmission of a signal indicating channel occupancy during the at least one first symbol and transmission of the second channel during the at least one second symbol.

The apparatus may comprise means for, if the respective one of physical layer signals and the first channel is scheduled to be transmitted in the at least one first symbol, causing transmission of the respective one of the physical layer signal and first channel during the at least one first symbol and transmission of the second channel during the at least one second symbol The at least one first symbol may comprise at least two first symbols, wherein at least one symbol of the at least two first symbols is associated with physical layer signals and at least one symbol of the at least two first symbols is associated with the first channel.

The apparatus may comprise means for determining if physical layer signals are scheduled to be transmitted in the at least one symbol associated with physical layer signals and means for, if physical layer signals are scheduled to be transmitted in the at least one symbol associated with physical layer signals, causing transmission of the physical layer signals during the at least one symbol associated with physical layer signals and transmission of the second channel during the at least one second symbol and means for, if physical layer signals are not scheduled to be transmitted in the at least one symbol associated with physical layer signals, causing transmission of the signal indicating channel occupancy in the at least one symbol associated with physical layer signals and transmission of the second channel during the at least one second symbol.

The apparatus may comprise means for determining if the first channel is scheduled to be transmitted in the at least one symbol associated with the first channel and means for, if the first channel is scheduled to be transmitted in the at least one symbol associated with the first channel, causing transmission of the first channel in the at least one symbol associated with the first channel and transmission of the second channel during the at least one second symbol and means for, if the first channel is not scheduled to be transmitted in the at least one symbol associated with the first channel, causing transmission of the signal indicating channel occupancy in the at least one symbol associated with the first channel and transmission of the second channel during the at least one second symbol.

The apparatus may comprise means for performing a listen before talk procedure to determine if said user device is capable of transmitting the at least one subframe in a first channel.

The apparatus may comprise means for receiving determined resources to be used for transmission of the respective one of physical layer signals and the first channel in the at least one first symbol.

The signal indicating channel occupancy may be associated with a cell to which the user device is associated.

Transmission power for the signal indicating channel occupancy may be different from the transmission power for physical layer signals, the first channel and the second channel.

Transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be one of a Zadoff-Chu sequence and a constant-amplitude zero-autocorrelation sequence.

The signal indicating the channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a fourth aspect there is provided an apparatus comprising means for receiving, from a user device, at least one subframe, the subframe having a subframe structure comprising at least one first symbol associated with one of physical layer signals and a first channel, and at least one second symbol associated with a second channel and the sub frame comprising, if the respective one of physical layer signals and the first channel is not scheduled to be transmitted in the at least one first symbol, a signal indicating channel occupancy during the at least one first symbol and the second channel during the at least one second symbol.

The sub frame may comprise, if the respective one of physical layer signals and the first channel is scheduled to be transmitted in the at least one first symbol, the respective one of the physical layer signal and first channel during the at least one first symbol and the second channel during the at least one second symbol;

The at least one first symbol may comprise at least two first symbols, wherein at least one symbol of the at least two first symbols is associated with physical layer signals and at least one symbol of the at least two first symbols is associated with the first channel.

If physical layer signals are scheduled to be transmitted in the at least one symbol associated with physical layer signals, the subframe may comprise physical layer signals during the at least one symbol associated with physical layer signals and the second channel during the at least one second symbol.

If physical layer signals are not scheduled to be transmitted in the at least one symbol associated with physical layer signals, the subframe may comprise a signal indicating channel occupancy in the at least one symbol associated with physical layer signals and the second channel during the at least one second symbol.

If the first channel is scheduled to be transmitted in the at least one symbol associated with the first channel, the subframe may comprise the first channel in the at least one symbol associated with the first channel and the second channel during the at least one second symbol.

If the first channel is not scheduled to be transmitted in the at least one symbol associated with the first channel, the subframe may comprise the signal indicating channel occupancy in the at least one symbol associated with the first channel and the second channel during the at least one second symbol.

The apparatus may comprise means for determining resources to be used for transmission of the respective one of physical layer signals and the first channel in the at least one first symbol and means for providing the determined resources to the user device.

The apparatus may comprise means for determining resources for the signal indicating channel occupancy, the resources associated with a cell to which the user device is associated and means for providing the determined resources to the user device.

Transmission power for the signal indicating channel occupancy may be different from the transmission power for physical layer signals, the first channel and the second channel.

The transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be a Zadoff-Chu sequence or a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a fifth aspect there is provided an apparatus, said apparatus comprising at least one processor and at least one memory including a computer program code, the at least one memory and the computer program code configured to, with the at least one processor, cause the apparatus at least to determine, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol and, if the respective one of physical layer signals and the first channel is not scheduled to be transmitted in the at least one first symbol, cause transmission of a signal indicating channel occupancy during the at least one first symbol and transmission of the second channel during the at least one second symbol.

The apparatus may be configured to, if the respective one of physical layer signals and the first channel is scheduled to be transmitted in the at least one first symbol, cause transmission of the respective one of the physical layer signal and first channel during the at least one first symbol and transmission of the second channel during the at least one second symbol The at least one first symbol may comprise at least two first symbols, wherein at least one symbol of the at least two first symbols is associated with physical layer signals and at least one symbol of the at least two first symbols is associated with the first channel.

The apparatus may be configured to determine if physical layer signals are scheduled to be transmitted in the at least one symbol associated with physical layer signals and, if physical layer signals are scheduled to be transmitted in the at least one symbol associated with physical layer signals, cause transmission of the physical layer signals during the at least one symbol associated with physical layer signals and transmission of the second channel during the at least one second symbol and, if physical layer signals are not scheduled to be transmitted in the at least one symbol associated with physical layer signals, cause transmission of the signal indicating channel occupancy in the at least one symbol associated with physical layer signals and transmission of the second channel during the at least one second symbol.

The apparatus may be configured to determine if the first channel is scheduled to be transmitted in the at least one symbol associated with the first channel and, if the first channel is scheduled to be transmitted in the at least one symbol associated with the first channel, cause transmission of the first channel in the at least one symbol associated with the first channel and transmission of the second channel during the at least one second symbol and, if the first channel is not scheduled to be transmitted in the at least one symbol associated with the first channel, cause transmission of the signal indicating channel occupancy in the at least one symbol associated with the first channel and cause transmission of the second channel during the at least one second symbol.

The apparatus may be configured to perform a listen before talk procedure to determine if said user device is capable of transmitting the at least one subframe in a first channel.

The apparatus may be configured to receive determined resources to be used for transmission of the respective one of physical layer signals and the first channel in the at least one first symbol.

The signal indicating channel occupancy may be associated with a cell to which the user device is associated.

Transmission power for the signal indicating channel occupancy may be different from the transmission power for physical layer signals, the first channel and the second channel.

Transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be one of a Zadoff-Chu sequence and a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a sixth aspect there is provided an apparatus, said apparatus comprising at least one processor and at least one memory including a computer program code, the at least one memory and the computer program code configured to, with the at least one processor, cause the apparatus at least to receive, from a user device, at least one subframe, the subframe having a subframe structure comprising at least one first symbol associated with one of physical layer signals and a first channel, and at least one second symbol associated with a second channel and the sub frame comprising, if the respective one of physical layer signals and the first channel is not scheduled to be transmitted in the at least one first symbol, a signal indicating channel occupancy during the at least one first symbol and the second channel during the at least one second symbol.

The sub frame may comprise, if the respective one of physical layer signals and the first channel is scheduled to be transmitted in the at least one first symbol, the respective one of the physical layer signal and first channel during the at least one first symbol and the second channel during the at least one second symbol;

The at least one first symbol may comprise at least two first symbols, wherein at least one symbol of the at least two first symbols is associated with physical layer signals and at least one symbol of the at least two first symbols is associated with the first channel.

If physical layer signals are scheduled to be transmitted in the at least one symbol associated with physical layer signals, the subframe may comprise physical layer signals during the at least one symbol associated with physical layer signals and the second channel during the at least one second symbol.

If physical layer signals are not scheduled to be transmitted in the at least one symbol associated with physical layer signals, the subframe may comprise a signal indicating channel occupancy in the at least one symbol associated with physical layer signals and the second channel during the at least one second symbol.

If the first channel is scheduled to be transmitted in the at least one symbol associated with the first channel, the subframe may comprise the first channel in the at least one symbol associated with the first channel and the second channel during the at least one second symbol.

If the first channel is not scheduled to be transmitted in the at least one symbol associated with the first channel, the subframe may comprise the signal indicating channel occupancy in the at least one symbol associated with the first channel and the second channel during the at least one second symbol.

The apparatus may be configured to determine resources to be used for transmission of the respective one of physical layer signals and the first channel in the at least one first symbol and provide the determined resources to the user device.

The apparatus may be configured to determine resources for the signal indicating channel occupancy, the resources associated with a cell to which the user device is associated and provide the determined resources to the user device.

Transmission power for the signal indicating channel occupancy may be different from the transmission power for physical layer signals, the first channel and the second channel.

The transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be a Zadoff-Chu sequence or a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a seventh aspect there is provided a computer program embodied on a non-transitory computer-readable storage medium, the computer program comprising program code for controlling a process to execute a process, the process comprising determining, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol and, if the respective one of physical layer signals and the first channel is not scheduled to be transmitted in the at least one first symbol, causing transmission of a signal indicating channel occupancy during the at least one first symbol and transmission of the second channel during the at least one second symbol.

The process may comprise, if the respective one of physical layer signals and the first channel is scheduled to be transmitted in the at least one first symbol, causing transmission of the respective one of the physical layer signal and first channel during the at least one first symbol and transmission of the second channel during the at least one second symbol The at least one first symbol may comprise at least two first symbols, wherein at least one symbol of the at least two first symbols is associated with physical layer signals and at least one symbol of the at least two first symbols is associated with the first channel.

The process may comprise determining if physical layer signals are scheduled to be transmitted in the at least one symbol associated with physical layer signals and, if physical layer signals are scheduled to be transmitted in the at least one symbol associated with physical layer signals, causing transmission of the physical layer signals during the at least one symbol associated with physical layer signals and transmission of the second channel during the at least one second symbol and, if physical layer signals are not scheduled to be transmitted in the at least one symbol associated with physical layer signals, causing transmission of the signal indicating channel occupancy in the at least one symbol associated with physical layer signals and transmission of the second channel during the at least one second symbol.

The process may comprise determining if the first channel is scheduled to be transmitted in the at least one symbol associated with the first channel and, if the first channel is scheduled to be transmitted in the at least one symbol associated with the first channel, causing transmission of the first channel in the at least one symbol associated with the first channel and transmission of the second channel during the at least one second symbol and, if the first channel is not scheduled to be transmitted in the at least one symbol associated with the first channel, causing transmission of the signal indicating channel occupancy in the at least one symbol associated with the first channel and transmission of the second channel during the at least one second symbol.

The process may comprise performing a listen before talk procedure to determine if said user device is capable of transmitting the at least one subframe in a first channel.

The process may comprise receiving determined resources to be used for transmission of the respective one of physical layer signals and the first channel in the at least one first symbol.

The signal indicating channel occupancy may be associated with a cell to which the user device is associated.

Transmission power for the signal indicating channel occupancy may be different from the transmission power for physical layer signals, the first channel and the second channel.

Transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be one of a Zadoff-Chu sequence and a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In an eighth aspect there is provided a computer program embodied on a non-transitory computer-readable storage medium, the computer program comprising program code for controlling a process to execute a process, the process comprising receiving, from a user device, at least one subframe, the subframe having a subframe structure comprising at least one first symbol associated with one of physical layer signals and a first channel, and at least one second symbol associated with a second channel and the sub frame comprising, if the respective one of physical layer signals and the first channel is not scheduled to be transmitted in the at least one first symbol, a signal indicating channel occupancy during the at least one first symbol and the second channel during the at least one second symbol.

The sub frame may comprise, if the respective one of physical layer signals and the first channel is scheduled to be transmitted in the at least one first symbol, the respective one of the physical layer signal and first channel during the at least one first symbol and the second channel during the at least one second symbol;

The at least one first symbol may comprise at least two first symbols, wherein at least one symbol of the at least two first symbols is associated with physical layer signals and at least one symbol of the at least two first symbols is associated with the first channel.

If physical layer signals are scheduled to be transmitted in the at least one symbol associated with physical layer signals, the subframe may comprise physical layer signals during the at least one symbol associated with physical layer signals and the second channel during the at least one second symbol.

If physical layer signals are not scheduled to be transmitted in the at least one symbol associated with physical layer signals, the subframe may comprise a signal indicating channel occupancy in the at least one symbol associated with physical layer signals and the second channel during the at least one second symbol.

If the first channel is scheduled to be transmitted in the at least one symbol associated with the first channel, the subframe may comprise the first channel in the at least one symbol associated with the first channel and the second channel during the at least one second symbol.

If the first channel is not scheduled to be transmitted in the at least one symbol associated with the first channel, the subframe may comprise the signal indicating channel occupancy in the at least one symbol associated with the first channel and the second channel during the at least one second symbol.

The process may comprise determining resources to be used for transmission of the respective one of physical layer signals and the first channel in the at least one first symbol and providing the determined resources to the user device.

The process may comprise determining resources for the signal indicating channel occupancy, the resources associated with a cell to which the user device is associated and providing the determined resources to the user device.

Transmission power for the signal indicating channel occupancy may be different from the transmission power for physical layer signals, the first channel and the second channel.

The transmission power for the signal indicating channel occupancy may be lower than the transmission power for transmissions for physical layer signals, the first channel and the second channel The signal indicating channel occupancy may be an interleaved frequency division multiple access signal or a block interleaved frequency division multiple access signal.

The signal indicating the channel occupancy may be a reference signal sequence.

The signal indicating the channel occupancy may be a Zadoff-Chu sequence or a constant-amplitude zero-autocorrelation sequence.

The signal indicating channel occupancy and the first channel may be scheduled to use different resources in the at least one first symbol.

The resources may comprise physical resource blocks, subcarriers or code-domain resources.

The first channel may be a physical uplink control channel. The second channel may be a physical uplink shared channel.

The physical layer signals may comprise reference signals.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
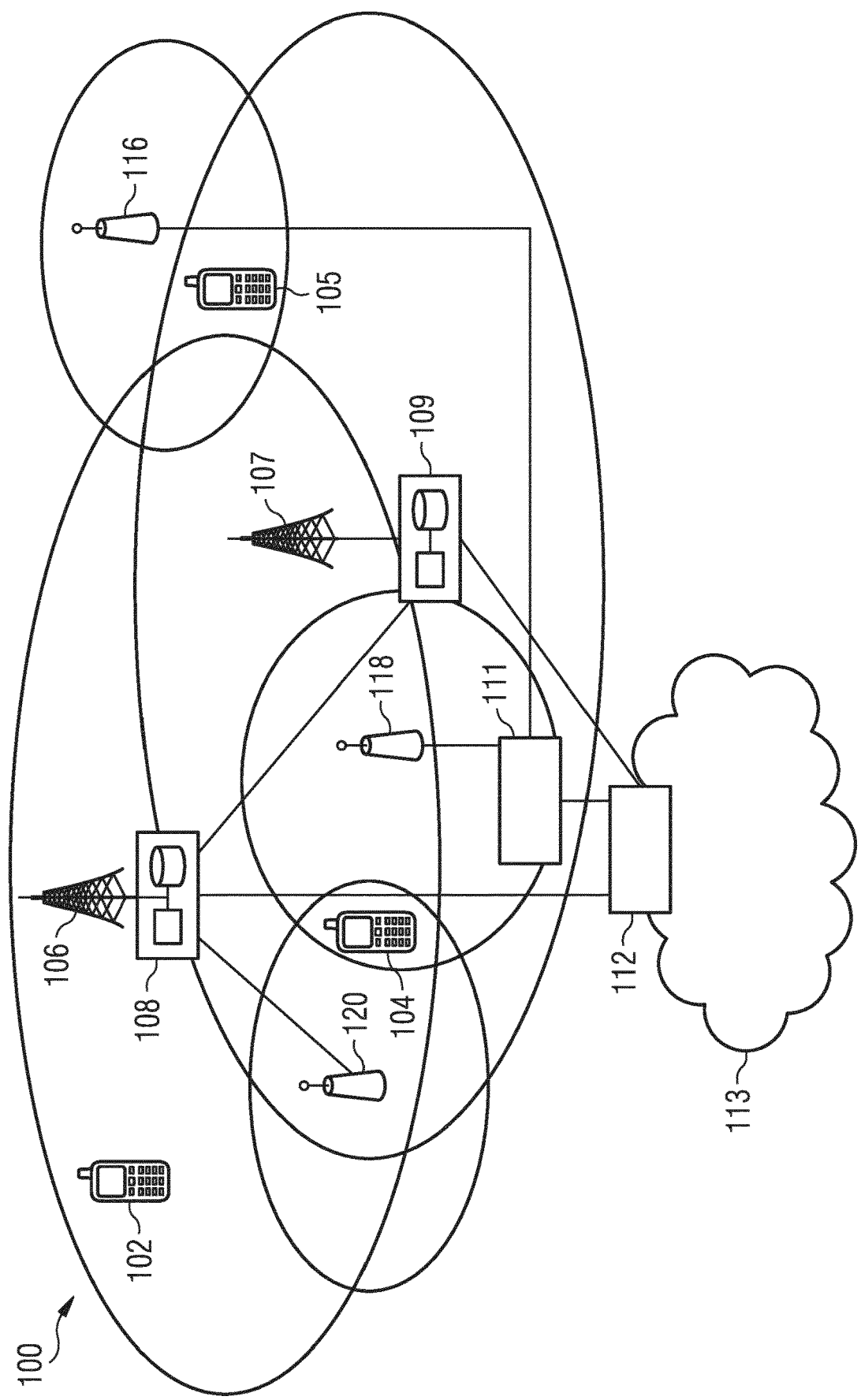
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
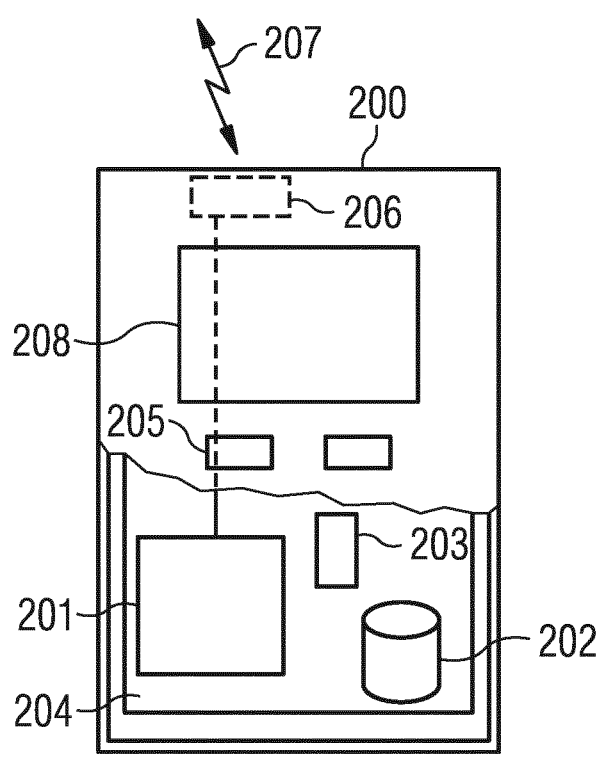
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Wireless communication systems may be licensed to operate in particular spectrum bands. A technology, for example LTE, may operate, in addition to a licensed band, in an unlicensed band. One proposal for operating in unlicensed spectrum is Licensed-Assisted Access (LAA). LAA may imply that a connection to a licensed band is maintained while using the unlicensed band. Moreover, in LAA, the licensed and unlicensed bands may be operated together using, e.g., carrier aggregation or dual connectivity. For example, carrier aggregation (CA) between primary cell (PCell) on a licensed band and one or more secondary cells (Scells) on unlicensed band may be applied.

LTE-LAA may provide licensed-assisted access to unlicensed spectrum while coexisting with other technologies and fulfilling regulatory requirements. In Rel-13 LAA, unlicensed spectrum is accessed to improve LTE DL throughput. In LTE LAA, the LAA downlink (DL) Scell may be configured for an UE as part of DL CA configuration, while the Pcell uses licensed spectrum. Rel-13 LTE LAA may evolve to support LAA uplink (UL) transmissions on unlicensed spectrum in LTE Rel-14.

The LTE LAA scenario discussed above, based on CA framework, may be based on the transmission of Uplink Control Information (UCI) on Pcell (licensed band).

However, LAA with dual connectivity operation (i.e. assuming non-ideal backhaul between Pcell in licensed spectrum and Scell(s) in unlicensed spectrum) and standalone LTE operation on unlicensed spectrum has been considered. LTE standalone operation on unlicensed spectrum means that eNB/UE air interface relies solely on unlicensed spectrum without any carrier on licensed spectrum. An example of LTE standalone operation is Qualcomm's recent announcement of MuLTEfire. Both dual connectivity and standalone operation modes involve transmission of UCI/physical uplink control channel (PUCCH) on unlicensed spectrum.

In some jurisdictions, unlicensed technologies may need to abide by certain regulations, e.g. Listen-Before-Talk (LBT), in order to provide fair coexistence between LTE and other technologies such as Wi-Fi as well as between LTE operators.

In unlicensed band operation, before being permitted to transmit, a user or an access point (such as eNodeB) may, depending on regulatory requirements, need to monitor a given radio frequency, i.e. carrier, for a short period of time to ensure the spectrum is not already occupied by some other transmission. This requirement is referred to as Listen-Before-Talk (LBT). The requirements for LBT vary depending on the geographic region: e.g. in the US such requirements do not exist, whereas in e.g. Europe and Japan the network elements operating on unlicensed bands need to comply with LBT requirements. Moreover, LBT may be needed in order to guarantee co-existence with other unlicensed band usage in order to enable e.g. fair co-existence with Wi-Fi also operating on the same spectrum and/or carriers.

To ensure reliable operation with LBT, transmissions should occupy effectively the whole nominal channel BandWidth (BW). For example, the European Telecommunications Standards Institute (ETSI) standards set requirements for the occupied channel bandwidth ("According to ETSI regulation, the Occupied Channel Bandwidth, defined to be the bandwidth containing 99% of the power of the signal, shall be between 80% and 100% of the declared Nominal Channel Bandwidth."). With a 20 MHz nominal channel bandwidth, this means that an LTE LAA transmission should have a bandwidth of at least 0.80*20 MHz=16 MHz.

This means that UL transmissions such as PUCCH and physical uplink shared channel (PUSCH) are required to occupy a large BW. This may be achieved by means of IFDMA, block-IFDMA, or contiguous resource allocation. However, each allocation with legacy subframe duration of 1 ms may comprise a large number of resource elements. For example, IFDMA allocation occupying every 24th subcarrier, i.e. 50 subcarriers, and having a duration of 1 ms, comprises 700 resource elements on a 20 MHz carrier. Such allocation may be too large in several situations, e.g. in the case when only few hybrid automatic repeat request-acknowledgement (HARQ-ACK) bits need to be transmitted. This motivates allowing for a shorter duration of PUCCH and, consequently, application of time division multiplex (TDM) between different channels such as PUCCH and PUSCH. Use of time division multiple access (TDMA) in UL may be seen as feasible since typically the target scenario involves small cells meaning that UE does not become power limited even with wider bandwidth allocations. TDMA approach may allow the single carrier properties of the transmitted signal to be maintained. On the other hand, when compared to frequency division multiple access (FDMA), TDMA may simplify the control/data multiplexing as well as provide improved interference handling for the critical control signals.

Figure 3:
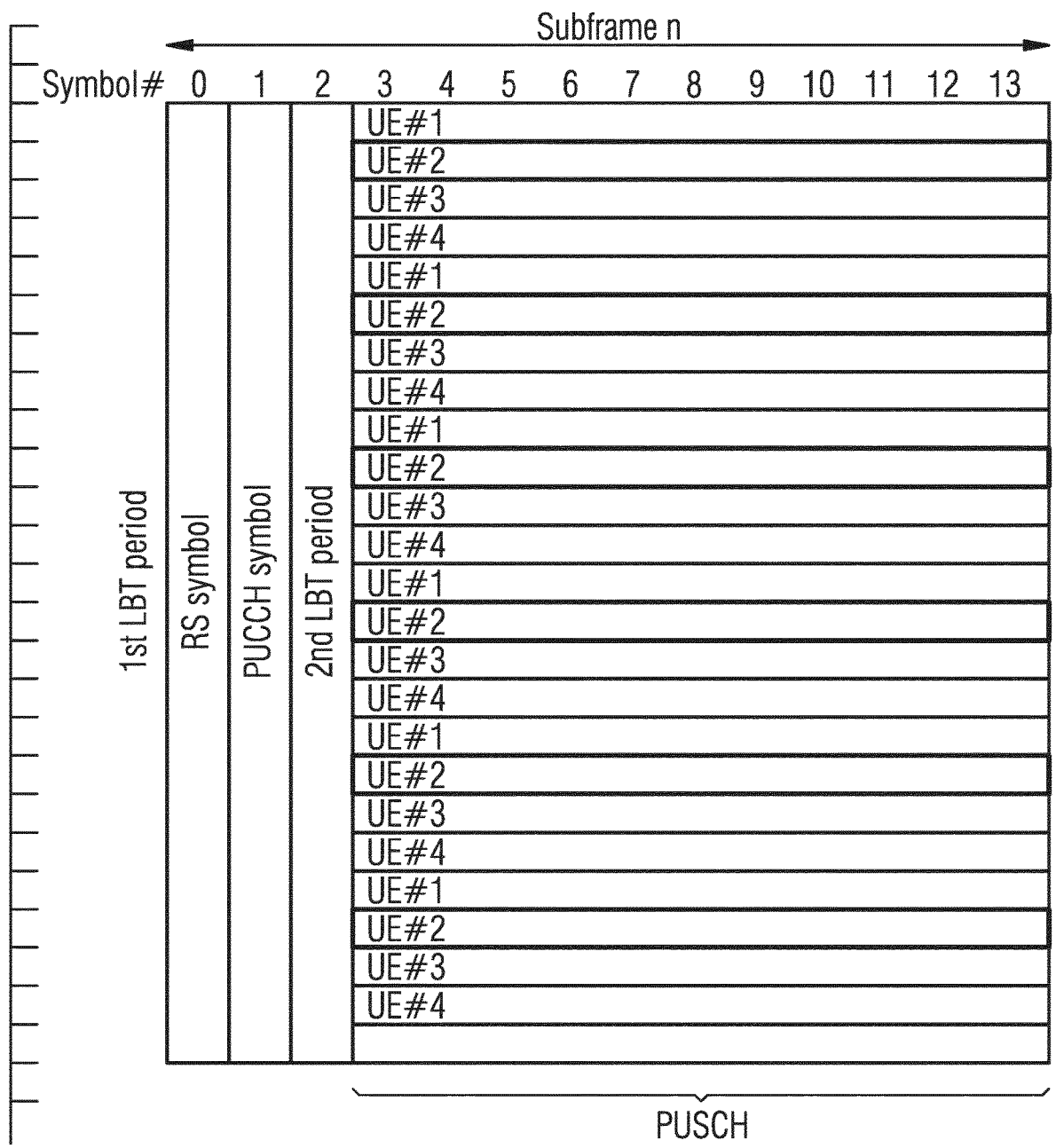
FIG. 3 shows a schematic diagram of an UL subframe structure.

FIG. 3 illustrates a situation, where TDM between a Reference Signal (RS) symbol (symbol #0 in the figure), PUCCH (symbol #1) and PUSCH (symbols #3 . . . 13) is applied. Each UE not transmitting PUCCH would need to perform LBT twice for one subframe, once before the transmission of the Reference Signal Symbol (before symbol #0), and once before the start of PUSCH transmission (during symbol #2).

LTE LAA targets a LBT procedure that supports multiplexing of multiple UEs in the same subframe. Multiple UEs can be scheduled to transmit PUCCH and/or PUSCH in the same or in consecutive subframes.

UEs transmitting both PUCCH and PUSCH may need to stop transmission during symbol #2. Otherwise their transmissions would block LBT procedure of UEs trying to start PUSCH transmission in symbol #3. In essence, this arrangement means that symbol #2 cannot be used for any transmissions in a cell, and results in an additional overhead of $\frac{1}{14}$=7.1%.

In the situation shown in FIG. 3, a separate LBT period occurs just before each possible time instance when a UE may need to start transmissions. For example, symbols #0 and #1 of a subframe are occupied by RS and PUCCH, respectively, and are followed by PUSCH for the remaining part of the subframe (the subframe having symbols with indices ranging from #0 to #13). In this case, at least symbol #13 of preceding subframe and symbol #2 at PUCCH/PUSCH border need to be reserved for LBT (i.e. left at least partially unoccupied).

As a result, LBT overhead may be unnecessarily increased due to the unused symbol #2. A UE that has allocation for both PUCCH and PUSCH may need to stop transmission for the LBT period between PUCCH and PUSCH. As a consequence of LBT, UE may lose access to the channel and hence the possibility to continue the transmission with PUSCH in that subframe. This may occur if UE is scheduled on multiple consecutive subframes.

The use of a reservation signal has been discussed in the context of LAA. A reservation signal may be used at the beginning of a DL transmission (Tx) burst until the start of the predefined regular orthogonal frequency division multiple access (OFDMA) symbol or the subframe border. The reservation signal is not used to facilitate TDM between data and control channels, rather the reservation signal indicates that certain channel is occupied.

It may be desirable to arrange PUCCH and PUSCH transmission so that efficient TDM and minimum number of unnecessary LBT measurements may be achieved.

Figure 4:
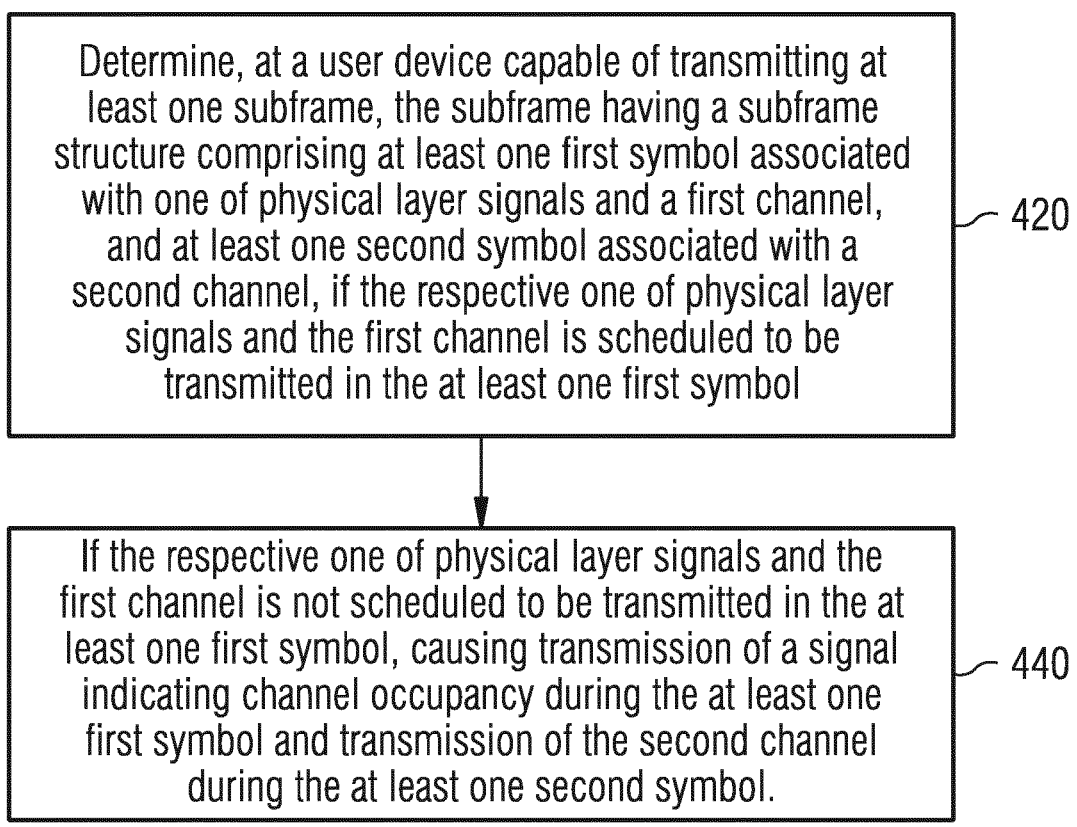
FIG. 4 shows a flowchart of an example method of transmission using TDM subframe.

FIG. 4 shows a flowchart of an example method of transmission using a TDM subframe. In a first step 420, the method comprises determining, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol In a second step 440, the method comprises, if the respective one of physical layer signals and the first channel is not scheduled to be transmitted in the at least one first symbol, causing transmission of a signal indicating channel occupancy during the at least one first symbol and transmission of the second channel during the at least one second symbol.

If the respective one of physical layer signals and the first channel is scheduled to be transmitted in the at least one first symbol, the method may comprise causing transmission of the respective one of the physical layer signal and first channel during the at least one first symbol and transmission of the second channel during the at least one second symbol The physical layer signals may be reference signals such as, but not limited to, sounding references signals (SRS) as well as demodulation reference signals (DMRS) for PUCCH and PUSCH demodulation. Reference signals may include signatures used for scheduling request/physical random access channel (PRACH). Alternatively, or in an addition to IFDMA/Block-IFDMA, cyclic shift multiplexing with down to 0.5 μs cyclic shift spacing may be used.

The first channel may be a control channel, e.g. a physical uplink control channel and the second channel may be a data channel, e.g. a physical uplink shared channel.

PUCCH symbols may carry, e.g. HARQ-ACK for DL physical downlink shared channel (PDSCH) transmission as well as periodic channel state information (CSI) reports.

The second channel may comprise a PUSCH region which may carry further reference signals, e.g. demodulation reference signals for PUSCH.

The method may comprise performing a listen before talk procedure to determine if said user device is capable of transmitting the at least one subframe in a first channel.

In an embodiment, all UEs that are scheduled, configured or triggered to transmit UL signals or channels during a burst, perform LBT preceding the transmission burst starting time and in case of positive LBT (i.e. determining that no transmission is occurring on the channel and the channel is unoccupied), start transmission at the beginning of transmission burst, consisting of a subframe or a set of subframes. The start of the transmission may be aligned with the subframe timing or other predefined/signaled timing reference.

Figure 5:
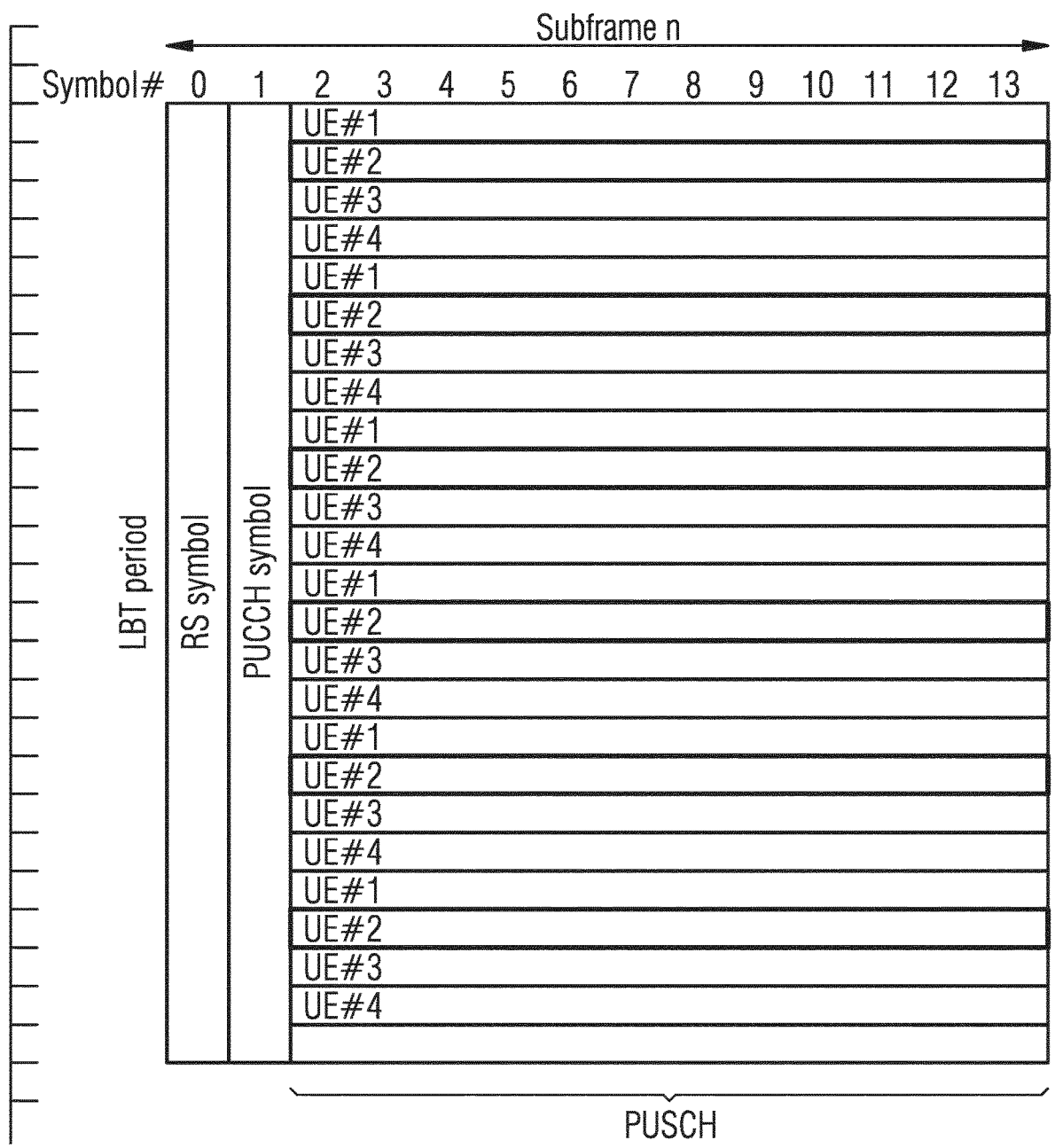
FIG. 5 shows a schematic diagram of an example UL subframe structure.

In FIG. 5, a UL subframe is shown in which UL transmission burst is preceded by an LBT period. FIG. 5 shows an example subframe structure comprising at least one first symbol associated with one of physical layer signals and a first channel, and at least one second symbol associated with a second channel. In a subframe structure such as that shown in FIG. 5, the at least one first symbol comprises at least two first symbols, wherein at least one symbol of the at least two first symbols, symbol #0 as shown, is associated with physical layer signals and at least one symbol of the at least two first symbols, symbol #1 as shown, of the two first symbols is associated with the first channel. The subframe structure shown in FIG. 5 comprises a multiplexing arrangement for UL physical signals which comprises a reference signal symbol in symbol #0, a PUCCH symbol in symbol #1 and PUSCH region in symbol #2 to #13.

Symbol #0, structured with, e.g., IFDMA/Block-IFDMA, may contain various reference signals. Symbol #0 may be referred to as Common RS symbol in the following.

Symbol #1, structured with, e.g., IFDMA or block-IFDMA, contains PUCCH and carries e.g. HARQ-ACK for DL data transport blocks as well as periodic CSI reports.

PUSCH covers symbols #2 . . . #13. PUSCH structure may be based on e.g. block IFDM allocation as shown in FIG. 4, or e.g. contiguous or IFDM allocation. Alternatively, or in addition, to PUSCH data, one or more of symbols 2 . . . 13 may contain demodulation reference signals.

UEs that do not have channels/signals to transmit during particular symbol(s) (e.g. PUCCH and/or Common RS symbol in FIG. 5) but have data to transmit in the following symbol(s) (e.g. PUSCH in FIG. 5), transmit a signal indicating channel occupancy, or reservation signal, during the said particular "extra" symbol(s).

For example, if a UE is not scheduled to transmit physical layer signals in a symbol associated with the physical layer signals (e.g. symbol #0 in FIG. 5) or is not scheduled to transmit a first channel in a symbol associated with the first channel (e.g. symbol #1 in FIG. 5), the UE may cause a reservation signal to be transmitted in the respective symbol.

In an embodiment, if the UE is not scheduled to transmit physical layer signals, e.g. common RS, and a first channel, such as PUCCH, the UE may transmit reservation signals both in the symbol associated with the physical layer signals (e.g. symbol #0 in FIG. 5) and the symbol associated with the first channel (e.g. symbol #1 in FIG. 5). Alternatively, the UE may transmit physical layer signals such as common RS in the symbol associated with physical layer signals, even if physical layer signals are not scheduled, and a reservation signal in the symbol associated with the first channel.

The signal indicating channel occupancy, or reservation signal, may be associated with a cell to which the user device is associated. In an embodiment, the transmitted reservation signal may be cell or network specific so that resource waste may be minimized. In other words, multiple UEs scheduled with PUSCH may transmit the same reservation signal on the same resources during the "extra" symbol(s).

The reservation signal may be an IFDMA/B-IFDMA signal occupying a predetermined FDM comb/interlace as well as a predetermined sequence. The predetermined sequence may be characterized by a sequence index and a cyclic shift. An IFDMA/B-IFDMA signal may ensure orthogonal multiplexing with signals carrying actual payload. For example, with repetition factor (RPF) of 24 (i.e. using 50 subcarriers with a spacing of 24 subcarriers), the reservation signal overhead is limited to ~4% of resource elements on a single symbol and ~0.3% of subframe resource elements. Even lower overhead may be possible subject to regulatory rules regarding channel occupancy in frequency Transmission power applied for the signal indicating channel occupancy may be defined in a different way compared to regular reference signal, PUCCH or PUSCH transmission. For example, certain predefined (minimum) Tx power or power spectral density value may applied when transmitting the reservation signal part. As an example, the reservation signal transmit power or PSD can be set to be always X dB lower than that of other signals (X may be a signaled parameter, or alternatively defined by the specification).

Certain (I)FDMA resources with given (Block-)RPF and starting offset may be configured for reservation signal. The resource configuration may be different for different subframe (or radio frame) symbols.

In practice, the existing RS sequences may be used as a reservation signal. In an embodiment, UE utilizes the existing LTE (S)RS sequences with certain cyclic shift as reservation signal. Alternatively, UE may utilize other Constant Amplitude Zero AutoCorrelation (CAZAC) or Zadof-Chu sequences, or modified Zadof-Chu sequences extended or truncated to a predefined sequence length. RPF may be defined in such that resources occupied by the reservation signal are minimized. The resource may hop in time.

Figure 6:
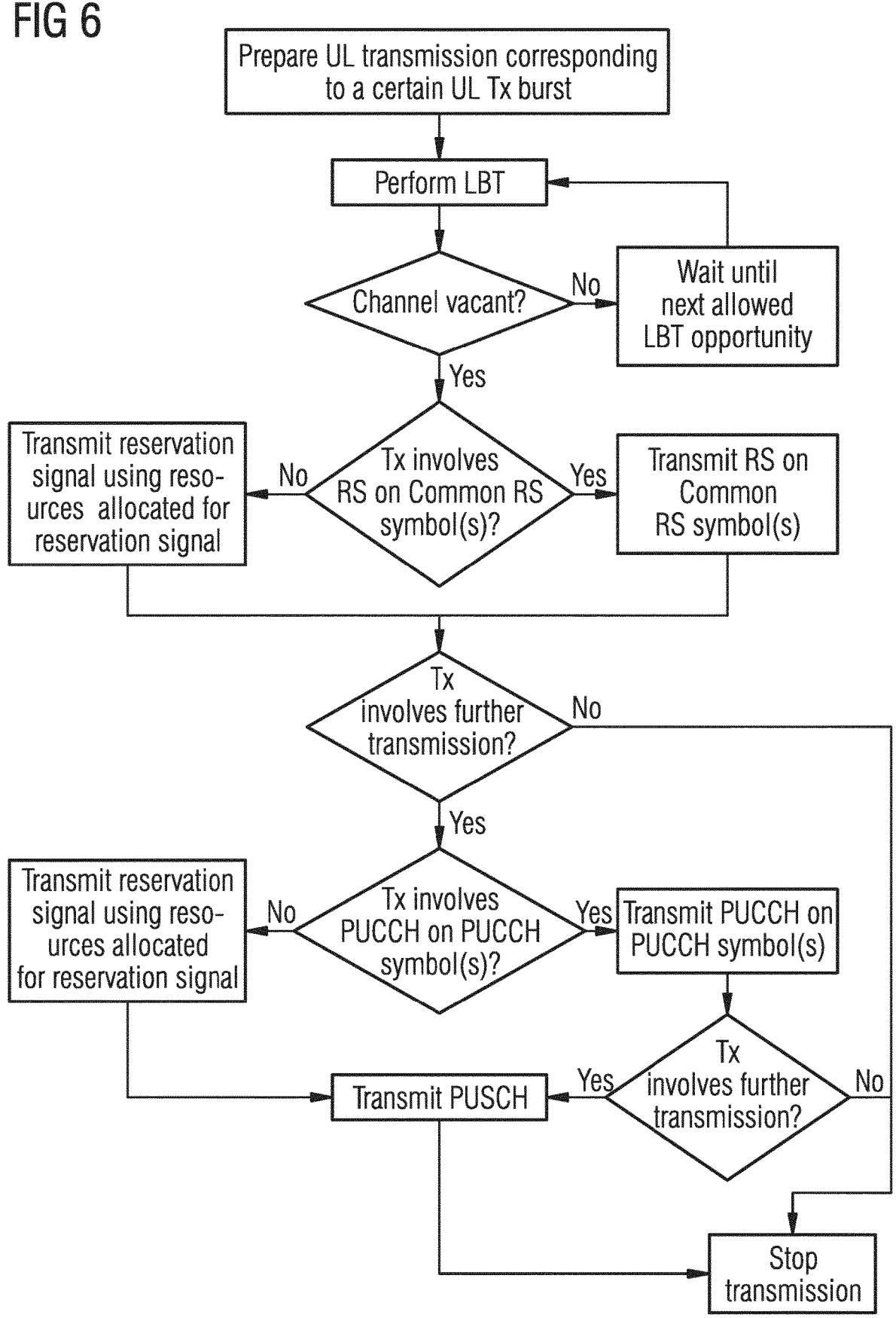
FIG. 6 shows a flowchart of an example method of transmission using a TDM subframe.

FIG. 6 shows a flow chart of an example method. The method comprises determining if transmission involves reference signals on Common RS symbol(s) and if transmission involves PUCCH on PUCCH symbols and, if not, transmitting reservation signals in the respective symbols, using resources allocated for the reservation signal. In an embodiment, not shown in this flowchart, existing RS sequences may be used as a signal indicating channel occupancy in a symbol associated with physical layer signals.

In embodiments, LBT overhead may be minimized (the same LBT serves Reference Signals, PUCCH and PUSCH). A UE having no PUCCH allocation doesn't lose the access to a channel when continuing PUSCH transmission after sounding reference signals (SRS)/PRACH.

Embodiments may be used to facilitate TDMA between PUCCH and PUSCH (which in turn allows both single carrier and multicarrier approaches for LAA UL)

It should be understood that each block of the flowcharts of the Figures and any combination thereof may be implemented by various means or their combinations, such as hardware, software, firmware, one or more processors and/or circuitry.

Figure 7:
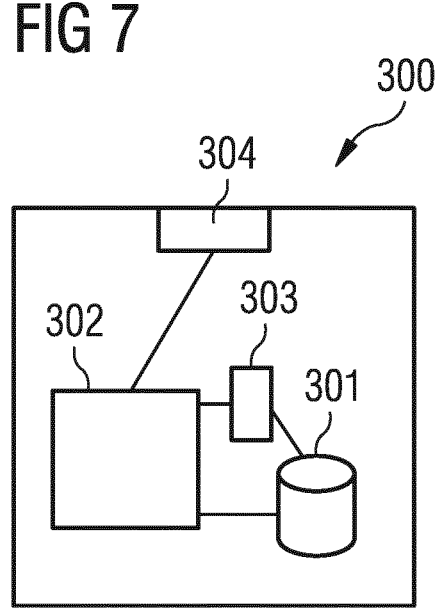
FIG. 7 shows a schematic diagram of an example control apparatus.

The method may be implemented on a mobile device as described with respect to FIG. 2 or control apparatus as shown in FIG. 7. FIG. 7 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise determining, at a user device capable of transmitting at least one subframe, the subframe having a subframe structure comprising at least one first symbol associated with one of physical layer signals and a first channel, and at least one second symbol associated with a second channel, if the respective one of physical layer signals and the first channel is scheduled to be transmitted in the at least one first symbol and, if the respective one of physical layer signals and the first channel is not scheduled to be transmitted in the at least one first symbol, causing transmission of a signal indicating channel occupancy during the at least one first symbol and transmission of the second channel during the at least one second symbol.

Alternatively, or in addition, control functions may comprise receiving, from a user device, at least one subframe, the subframe having a subframe structure comprising at least one first symbol associated with one of physical layer signals and a first channel, and at least one second symbol associated with a second channel and the sub frame comprising, if the respective one of physical layer signals and the first channel is not scheduled to be transmitted in the at least one first symbol, a signal indicating channel occupancy during the at least one first symbol and the second channel during the at least one second symbol.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE networks, similar principles may be applied in relation to other networks and communication systems, for example, 5G networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
    at a user device capable of transmitting a subframe toward a wireless network, the subframe having a subframe structure comprising at least one first symbol associated with one of physical layer signals or a first channel, and at least one second symbol associated with a second channel, determining whether a respective one of the physical layer signals or the first channel is scheduled to be transmitted in the at least one first symbol; and
    in response to the respective one of the physical layer signals or the first channel being determined not to be scheduled to be transmitted in the at least one first symbol and the second channel is scheduled to be transmitted during the at least one second symbol, causing transmission from the user device toward the wireless network of a signal indicating channel occupancy during the at least one first symbol and causing transmission from the user device toward the wireless network of the second channel during the at least one second symbol.

2. A method according to claim 1, wherein the at least one first symbol comprises at least two first symbols, wherein at least one symbol of the at least two first symbols is associated with physical layer signals and at least one symbol of the at least two first symbols is associated with the first channel.

3. A method according to claim 2, comprising determining whether physical layer signals are scheduled to be transmitted in the at least one symbol associated with physical layer signals; and
    in response to physical layer signals being scheduled to be transmitted in the at least one symbol associated with physical layer signals, causing transmission of the physical layer signals during the at least one symbol associated with physical layer signals and transmission of the second channel during the at least one second symbol; and
    in response to physical layer signals not being scheduled to be transmitted in the at least one symbol associated with physical layer signals, causing transmission of the signal indicating channel occupancy in the at least one symbol associated with physical layer signals and transmission of the second channel during the at least one second symbol.

4. A method according to claim 3, comprising determining whether the first channel is scheduled to be transmitted in the at least one symbol associated with the first channel; and
    in response to the first channel being scheduled to be transmitted in the at least one symbol associated with the first channel, causing transmission of the first channel in the at least one symbol associated with the first channel and transmission of the second channel during the at least one second symbol; and
    in response to the first channel not being scheduled to be transmitted in the at least one symbol associated with the first channel, causing transmission of the signal Indicating channel occupancy in the at least one symbol associated with the first channel and transmission of the second channel during the at least one second symbol.

5. A method according to claim 1, comprising performing a listen before talk procedure to determine whether said user device is capable of transmitting the subframe in a first channel.

6. A method according to claim 1, comprising receiving determined resources to be used for transmission of the respective one of physical layer signals or the first channel in the at least one first symbol.

7. A method according to claim 1, wherein the signal indicating the channel occupancy is a reference signal sequence.

8. A computer program embodied on a non-transitory computer-readable storage medium, the computer program comprising program code for controlling a process to execute a method according to claim 1.

9. A method according to claim 1, wherein the first channel is a physical uplink control channel time division multiplexed with the second channel.

10. A method according to claim 9, wherein the second channel is a physical uplink shared channel.

11. A method according to claim 1, wherein the signal indicating channel occupancy is a reference signal sequence.

12. A method comprising:
receiving, at a network node in a wireless network and from a user device, a subframe, the subframe having a subframe structure comprising at least one first symbol associated with one of physical layer signals or a first channel, and at least one second symbol associated with a second channel; and
the sub frame comprising, in response to a respective one of the physical layer signals or the first channel not being scheduled to be transmitted in the at least one first symbol and the second channel is scheduled to be transmitted during the at least one second symbol, a signal indicating channel occupancy during the at least one first symbol and the second channel during the at least one second symbol.

13. A method according to claim 12, wherein the at least one first symbol comprises at least two first symbols, wherein at least one symbol of the at least two first symbols is associated with physical layer signals and at least one symbol of the at least two first symbols Is associated with the first channel.

14. A method according to claim 13 wherein in response to physical layer signals being scheduled to be transmitted in the at least one symbol associated with physical layer signals, the subframe comprises physical layer signals during the at least one symbol associated with physical layer signals and the second channel during the at least one second symbol; and
in response to physical layer signals not being scheduled to be transmitted in the at least one symbol associated with physical layer signals, the subframe comprises a signal indicating channel occupancy in the at least one symbol associated with physical layer signals and the second channel during the at least one second symbol.

15. A method according to claim 13, comprising:
in response to the first channel being scheduled to be transmitted in the at least one symbol associated with the first channel, the subframe comprises the first channel In the at least one symbol associated with the first channel and the second channel during the at least one second symbol; and
in response to the first channel not being scheduled to be transmitted in the at least one symbol associated with the first channel, the subframe comprises the signal Indicating channel occupancy In the at toast one symbol associated with the first channel and the second channel during the at least one second symbol.

16. A method according to claim 12 comprising determining resources to be used for transmission of the respective one of physical layer signals and the first channel in the at least one first symbol, and providing the determined resources to the user device.

17. A method according to claim 12, comprising determining resources for the signal indicating channel occupancy, the resources associated with a cell to which the user device is associated, and providing the determined resources to the user device.

18. A method according to claim 12, wherein the signal indicating the channel occupancy is a reference signal sequence.

19. An apparatus comprising:
at least one processor and at least one memory Including a computer program code, the at least one memory and the computer program code configured to, with the at least one processor, cause the apparatus at least to:
at a user device capable of transmitting a subframe toward a wireless network, the subframe having a subframe structure comprising at least one first symbol associated with one of physical layer signals or a first channel, and at least one second symbol associated with a second channel, determine whether a respective one of the physical layer signals or the first channel is scheduled to be transmitted in the at least one first symbol; and
in response to the respective one of the physical layer signals or the first channel being determined not to be scheduled to be transmitted in the at least one first symbol and the second channel is scheduled to be transmitted during the at least one second symbol, cause transmission from the user device toward the wireless network of a signal indicating channel occupancy during the at least one first symbol and cause transmission from the user device toward the wireless network of the second channel during the at least one second symbol.

20. An apparatus comprising:
at least one processor and at least one memory including a computer program code, the at least one memory and the computer program code configured to, with the at least one processor, cause the apparatus at least to:
receive, at a network node in a wireless network and from a user device, a subframe, the subframe having a subframe structure comprising at least one first symbol associated with one of physical layer signals or a first channel, and at least one second symbol associated with a second channel; and
in response to a respective one of the physical layer signals or the first channel not being scheduled to be transmitted in the at least one first symbol and the second channel is scheduled to be transmitted during the at least one second symbol, the subframe comprises a signal indicating channel occupancy during the at least one first symbol and the second channel during the at least one second symbol.

* * * * *